United States Patent
Tsukamoto et al.

(10) Patent No.: US 11,390,358 B2
(45) Date of Patent: Jul. 19, 2022

(54) BICYCLE ELECTRIC POWER ASSIST DEVICE AND BICYCLE

(71) Applicant: HONDA MOTOR CO., LTD., Tokyo (JP)

(72) Inventors: Kenji Tsukamoto, Saitama (JP); Yoshihiro Namiki, Saitama (JP); Satoshi Honda, Saitama (JP); Hiroyuki Kikuchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 30 days.

(21) Appl. No.: 16/977,593

(22) PCT Filed: Feb. 5, 2019

(86) PCT No.: PCT/JP2019/004112
§ 371 (c)(1),
(2) Date: Sep. 2, 2020

(87) PCT Pub. No.: WO2019/171860
PCT Pub. Date: Sep. 12, 2019

(65) Prior Publication Data
US 2021/0039745 A1    Feb. 11, 2021

(30) Foreign Application Priority Data

Mar. 5, 2018  (JP) .............................. JP2018-039072

(51) Int. Cl.
*B62M 6/55* (2010.01)
*B62M 6/90* (2010.01)

(52) U.S. Cl.
CPC ................ *B62M 6/55* (2013.01); *B62M 6/90* (2013.01)

(58) Field of Classification Search
CPC ........... B62M 6/55; B62M 3/003; B62M 3/02
(Continued)

(56) References Cited

U.S. PATENT DOCUMENTS

| 4,871,042 A | 10/1989 | Hsu et al. |
| 5,062,318 A | 11/1991 | Yamazaki |

(Continued)

FOREIGN PATENT DOCUMENTS

| CN | 2405860 Y | 11/2000 |
| CN | 102910247 A | 2/2013 |

(Continued)

OTHER PUBLICATIONS

China First Notification of Office Action for Application CN 201980017014.5 dated May 6, 2021; 17 pp.
(Continued)

*Primary Examiner* — Anne Marie M Boehler
(74) *Attorney, Agent, or Firm* — Armstrong Teasdale LLP

(57) ABSTRACT

A wide range of existing bicycles can be converted into electric power assisted bicycles with ease. The bicycle electric power assist device comprises a housing (52) configured to be attached to a frame (18) of a bicycle (10), an electric motor (54) attached to the housing (52), a battery (102) configured to be mounted to the frame and serves as a power source for the electric motor, an annular rotational output member (81) rotationally driven by the electric motor (54), the rotational output member being rotatably mounted on the housing and positioned around a crank axis line which is a rotational center line A of a crankshaft (24) and a crank arm (26) for a pedal of the bicycle, and a connecting member (90) connecting the rotational output member (81) to the crankshaft (24) or the crank arm (26) in a torque transmitting relationship.

9 Claims, 7 Drawing Sheets

(58) Field of Classification Search
USPC .............................................. 74/594.1, 594.2
See application file for complete search history.

(56) References Cited

U.S. PATENT DOCUMENTS

| | | | |
|---|---|---|---|
| 5,242,028 A | 9/1993 | Murphy et al. | |
| 5,772,547 A | 6/1998 | Terada | |
| 2012/0312618 A1* | 12/2012 | Chan ...................... | B62M 6/55 |
| | | | 180/206.4 |
| 2013/0032425 A1 | 2/2013 | Lee et al. | |
| 2014/0060212 A1 | 3/2014 | Tetsuka et al. | |
| 2015/0247767 A1 | 9/2015 | Tetsuka | |
| 2016/0159435 A1 | 6/2016 | Yehuda et al. | |
| 2018/0354580 A1* | 12/2018 | Hara ...................... | B62M 9/02 |
| 2021/0052941 A1* | 2/2021 | Tsukamoto .............. | B62J 43/20 |
| 2021/0061410 A1* | 3/2021 | Tsukamoto .............. | B62M 11/00 |
| 2021/0214042 A1* | 7/2021 | Tsukamoto .............. | B62M 11/02 |

FOREIGN PATENT DOCUMENTS

| | | | | |
|---|---|---|---|---|
| CN | 203172838 U | | 9/2013 | |
| CN | 108423115 A | * | 8/2018 | .............. B62M 6/45 |
| DE | 102016014681 A1 | * | 6/2017 | .............. F16H 55/30 |
| EP | 0431573 A1 | | 6/1991 | |
| FR | 395307 A | | 2/1909 | |
| JP | H09328092 A | | 12/1997 | |
| JP | H10147283 A | | 6/1998 | |
| JP | H11303953 A | | 11/1999 | |
| JP | 2001260979 A | | 9/2001 | |
| JP | 2002264881 A | | 9/2002 | |
| JP | 2007091159 A | | 4/2007 | |
| JP | 2009248668 A | | 10/2009 | |
| JP | WO2008120311 A1 | | 7/2010 | |
| JP | 2013095311 A | | 5/2013 | |
| JP | 2020152369 | * | 9/2020 | .............. B62M 6/55 |

OTHER PUBLICATIONS

EPO Extended Search Report for EP Application 19764761.3 dated Feb. 23, 2021; 11 pp.
Office Action for Patent Application EP 19764761.3 dated Nov. 4, 2021; 7 pp.
Bimoz User Manual, INDIEGOGO Edition, Version 1.0, 2016, 9 pp.
Go-e ONWheel Complete Kit User Manual, 2016; 28 pp.
International Search Report for JP Patent Application PCT/JP2019/004112 dated Apr. 23, 2019; 2 pp.

* cited by examiner

US 11,390,358 B2

BICYCLE ELECTRIC POWER ASSIST DEVICE AND BICYCLE

CROSS-REFERENCE TO RELATED APPLICATIONS

This application is a U.S. National Phase Application of PCT/JP2019/004112, filed Feb. 5, 2019, which claims the benefit of priority to JP Application No. 2018-039072, filed Mar. 5, 2018, the contents of which are hereby expressly incorporated by reference in their entirety.

TECHNICAL FIELD

The present invention relates to a bicycle electric power assist device and a bicycle, and more particularly to a bicycle electric power assist device that can be retrofitted and a bicycle to which such an electric power assist device is installed.

BACKGROUND ART

In a conventional bicycle electric power assist device that can be retrofitted to an existing bicycle, an assist gear rotationally driven by an electric motor for providing an assist force is coaxially mounted to a side of a sprocket fixedly secured to a central shaft of a crank arm fitted with a pedal, and the assist gear and the sprocket are connected to each other via a pin so that the assist force may be applied to the sprocket (see Patent Document 1, for instance). In another known device, a main gear rotationally driven by an electric motor for providing an assist force is disposed in a coaxial relationship to the central shaft of the crank arm fitted with a pedal, and the main gear and the crank arm are connected to each other via a pin so that the assist force may be applied to the crank arm (see Patent Document 2, for instance). In yet another known device, a sprocket rotationally driven by an electric motor for providing an assist force is coaxially connected to the crank arm (see Patent Document 3, for instance).

PRIOR ART DOCUMENT(S)

Patent Document(s)

Patent Document 1: JP2007-91159A
Patent Document 2: JP2009-248668A
Patent Document 3: JP2002-264881A

SUMMARY OF THE INVENTION

Task to be Accomplished by the Invention

These conventional bicycle electric power assist devices that can be retrofitted require a relatively extensive disassembly work such as removing the crank arm and the sprocket, and an assembly work to put the removed component parts such as the crank arm back to the original assembled state when installing the device on the bicycle, in addition to the disassembling and assembling of the bicycle electric power assist device itself. Furthermore, the disassembling and assembling work may require special tools in addition to common tools such as wrenches and spanners. For this reason, an ordinary user without any technical background may find it difficult to convert an existing bicycle into an electric power assisted bicycle by retrofitting an electric power assist device to the bicycle.

Furthermore, conventional bicycle electric power assist devices may not be retrofitted to the existing bicycles depending on the models thereof, and are therefore known to be lacking in versatility.

In view of such a problem of the prior art, a primary object of the present invention is to allow common users to convert a wide range of bicycles into electric power assisted bicycles with ease.

To achieve such an object, as an embodiment of the present invention, there is provided a bicycle electric power assist device, comprising: a housing (52) configured to be attached to a frame (18) of a bicycle (10); an electric motor (54) attached to the housing (52); a battery (102) serving as a power source for the electric motor; an annular rotational output member (81) rotationally driven by the electric motor (54), the rotational output member being rotatably mounted on the housing and positioned around a crank axis line which is a rotational center line of a crankshaft (24) and a crank arm (26) for a pedal of the bicycle; and a connecting member (90, 130) connecting the rotational output member (81) to the crankshaft (24) or the crank arm (26) in a torque transmitting relationship.

Thereby, the bicycle electric power assist device (50) can be retrofitted to an existing bicycle (10) with ease without being required to modify the bicycle (10).

In this bicycle electric power assist device, preferably, the housing (52) includes an annular part (52C) that concentrically supports the rotational output member (81), and the rotational output member (81) and the annular part (52C) are positioned between the frame (18) and the crank arm (26).

Thereby, the crank arm (26) can be passed through the rotational output member (81) and the annular part (52C) so that the rotational output member (81) and the annular part (52C) can be positioned between the frame (18) and the crankarm (26) without removing the crankarm (26), and the retrofitting of the bicycle electric power assist device (50) to the bicycle (10) can be simplified.

In this bicycle electric power assist device, preferably, the annular part (52C) is provided with a tubular portion (72) defining a central opening (70) through which the crankshaft (72) loosely passes, and the rotational output member (81) is coaxially and rotatably mounted on an outer periphery of the tubular portion (72).

Thereby, the rotational output member (81) can be supported with a simple structure by using the tubular portion (72) that defines the central opening (70).

Preferably, this bicycle electric power assist device further comprises a transmission gear train (59) received in the housing (52) and configured to transmit a rotational motion of the electric motor (54) to the rotational output member (81), the electric motor (54) being displaced radially outward from the rotational output member (81) via the transmission gear train (59) which is positioned between the electric motor (54) and the rotational output member (81).

Thereby, the electric motor (54) allows the rotational output member (81) to be mounted on the crankshaft (24) without the electric motor (54) impeding the mounting of the rotational output member (81) to the crankshaft (24).

In this bicycle electric power assist device, preferably, the rotational output member (81) is provided with an output gear (80) of the transmission gear train (59) and a rotational output plate (84) attached to a side of the output gear (80), the rotational output plate (84) having a larger outer diameter than the output gear (80).

Thereby, the rotational output plate (84) serves as a cover member for the output gear (80), and protects the teeth of the output gear (80).

In this bicycle electric power assist device, preferably, the electric motor (54) is offset in an axial direction relative to the rotational output member (81), and in contact with the frame (18) so that the electric motor (54) is held rotationally fast to the frame (18).

Thereby, the electric motor (54) is prevented from rotating relative to the frame (18) in a both simple and reliable manner.

In this bicycle electric power assist device, preferably, the connecting member (90) coaxially connects the rotational output member (81) to an axial end of the crankshaft (24).

Thereby, the rotational output member (81) can be connected to the crankshaft (24) without a fear of misalignment so that the assist force can be favorably transmitted from the rotational output member (81) to the crankshaft (24) or the crank arm (26).

In this bicycle electric power assist device, preferably, the connecting member (90) includes a central portion (91) secured to a shaft end of the crankshaft (24) by a screw (40) threaded into a threaded hole (36) formed centrally in the shaft end, and at least one leg (92) extending radially outward from the central portion and secured to the rotational output member (81) at a free end thereof.

Thus, the bicycle electric power assist device can be applied to a bicycle of a type having a threaded hole (36) for pulling the crankshaft in the shaft end of the crankshaft (24) so that the assist force can be favorably transmitted from the connecting member (90) to the crankshaft (24).

In this bicycle electric power assist device, preferably, the connecting member (90) includes a central portion (91) opposing an outer surface of a shaft end of the crankshaft (24) by a screw (40) threaded into a threaded hole (36) formed centrally in the shaft end, and at least one leg (92) extending radially outward from the central portion and secured to the rotational output member (81) at a free end thereof, and the bicycle electric power assist device further comprises a spacer member (120) including a part located between the leg (92) and a base end of the crank arm (26) and surrounding the base end of the crank arm (26) in a shape of letter-U to connect the connecting member (90) to the crank arm (26) in a torque transmitting relationship.

Thus, the bicycle electric power assist device can be applied to a bicycle of a type not having a threaded hole (36) for pulling the crankshaft in the shaft end of the crankshaft (24) so that the assist force can be favorably transmitted from the connecting member (90) to the crankshaft (24).

In this bicycle electric power assist device, preferably, the connecting member (130) projects from the rotational output member (81) so as to interpose the crank arm (26) from two sides with respect to a rotational direction thereof and to be slidable with respect to the crank arm (26) in a lengthwise direction thereof.

Thereby, the transmission of assist from the rotational output member (81) to the crank arm (26) can be effected in a favorable manner with a highly simple structure.

A bicycle according to an embodiment of the present invention is fitted with this bicycle electric power assist device (50).

Thereby, an existing bicycle (10) can be used as an electric power assisted bicycle without modifying the bicycle.

Effect of the Invention

According to the bicycle electric power assist device of the present invention, a wide range of existing bicycles (10) can be converted into electric power assisted bicycles with ease.

BRIEF DESCRIPTION OF THE DRAWING(S)

DESCRIPTION OF THE PREFERRED EMBODIMENT(S)

A bicycle electric power assist device according to an embodiment of the present invention is described in the following with reference to FIGS. 1 to 4.

Figure 1:
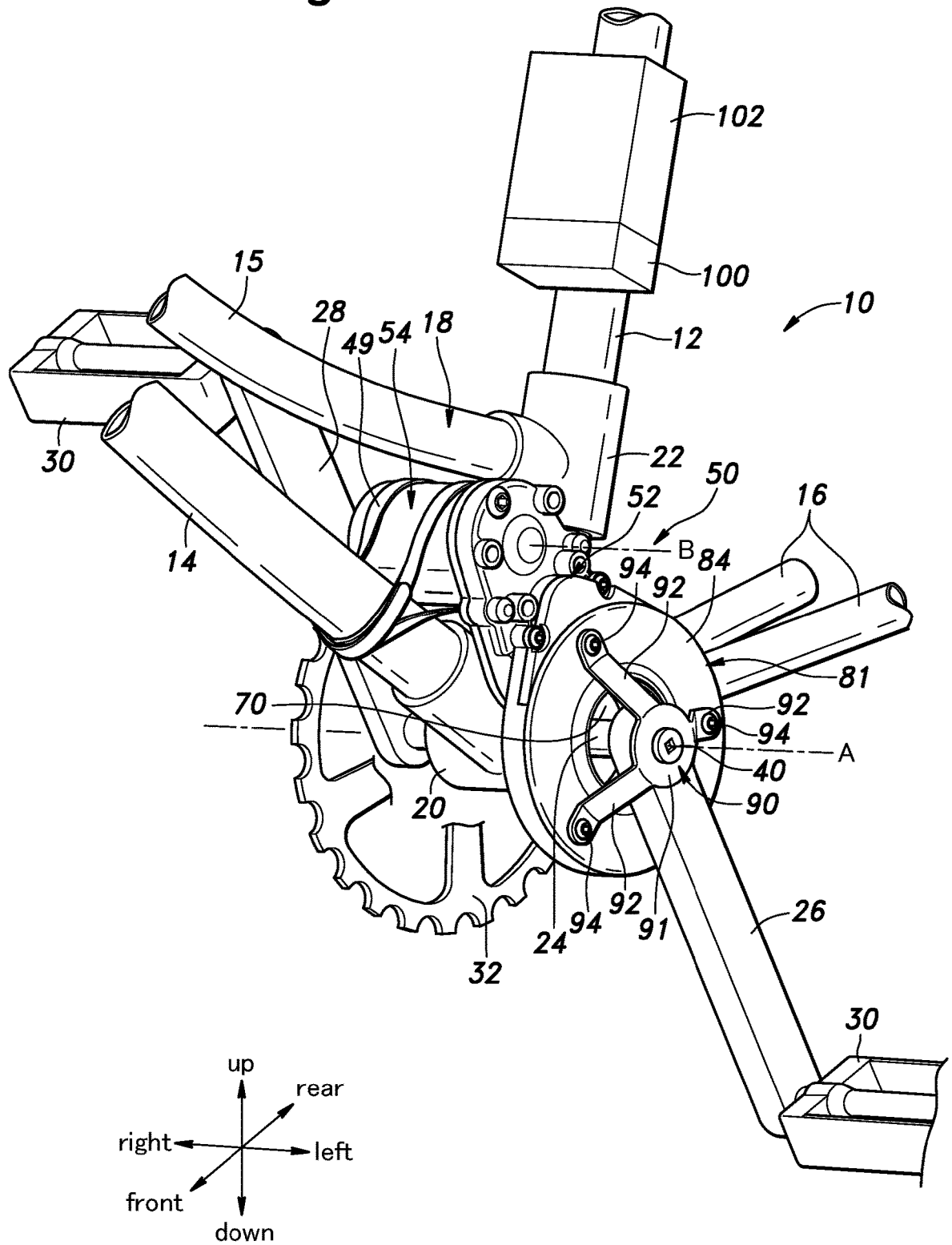
FIG. 1 is a perspective view of a principal part of a bicycle to which a bicycle electric power assist device according to an embodiment of the present invention is mounted.
Figure 2:
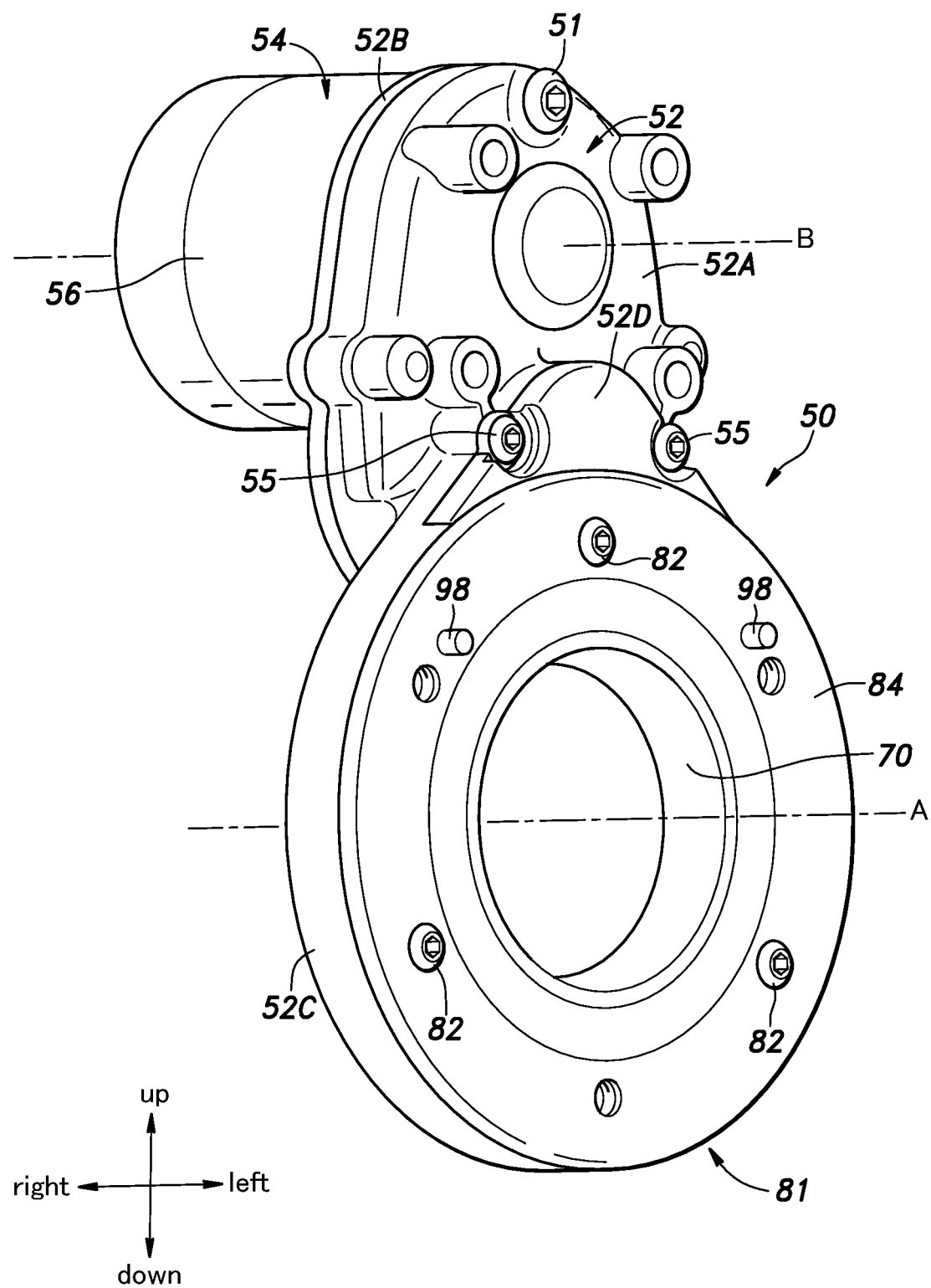
FIG. 2 is a perspective view of the bicycle electric power assist device according to the embodiment of the present invention.

As shown in FIG. 1, the bicycle 10 is provided with a frame 18 that includes a seat tube 12 that extends substantially in the vertical direction, and is provided with a saddle (not shown in the drawings) attached to the upper end thereof, a down tube 14 and an auxiliary tube 15 that extend in a substantially fore and aft direction, and a pair of chain stays 16. The lower end of the seat tube 12, the rear end of the down tube 14, and the front ends of the chain stays 16 are connected to one another via a tubular bearing housing 20 which serves as a housing for receiving a bearing of a crankshaft as well as a pipe joint. The rear end of the auxiliary tube 15 is connected to a part of the seat tube 12 adjoining the lower end thereof via a pipe joint 22.

The tubular bearing housing 20 rotatably supports a crankshaft (drive shaft) 24 extending substantially horizontally in the lateral direction. The left and right ends of the crankshaft 24 protrude from the tubular bearing housing 20 in the laterally outward direction, and the base ends of a left crank arm 26 and a right crank arm 28 are fixed to the respective shaft ends with a rotational phase difference of 180 degrees. The crankshaft 24 forms the rotational center of the crank arms 26 and 28, and the rotation center axis of the crankshaft 24 and the rotation center axis of the crank arms 26 and 28 coincide with a common crank axis A. In other words, the crank axis A forms the rotation center axis of both the crankshaft 24 and the crank arms 26.

A pedal 30 is attached to the free end of each crank arm 26, 28. A drive sprocket 32 is positioned between the right crank arm 28 and the tubular bearing housing 20. The drive sprocket 32 is coaxially connected (fixed) to the crankshaft 24.

The crankshaft 24 is rotationally driven by the left and right crank arms 26 and 28. The rotation of the crankshaft 24 is transmitted to the drive sprocket 32 (chain wheel), and thence to the rear wheel (not shown in the drawings) via a chain transmission mechanism (not shown in the drawings). Thereby, the bicycle 10 is propelled forward.

So far, this structure is no different from the common existing structure of a bicycle 10.

A bicycle electric power assist device 50 (which will be abbreviated as "electric power assist device 50" hereinafter) according to this embodiment is mounted on the bicycle 10. In the following description, the up, down, front, back, and left and right directions will be based on the viewpoint of a rider when the electric power assist device 50 is attached to the frame 18 of the bicycle 10 as shown in FIG. 1.

As shown in FIGS. 1 to 4, the electric motor device (electric motor unit) 50 is provided with a housing 52 having a hollow structure which is formed by an assembly of a first half 52A on the left side, a second half 52B on the right side, and a cover member 52D. The first half 52A and the second half 52B are joined to each other by a plurality of threaded bolts 51. The cover member 52D is joined to the left side of the first half 52A by a plurality of threaded bolts 55.

An electric motor 54 is attached to the housing 52. The electric motor 54 is provided with a cylindrical outer casing 56 having a laterally extending central axis B and fixed to the outer surface of the second half 52B at the base end thereof. Thus, the outer casing 56 protrudes rightward from the second half 52B so as to be offset toward one side in the axial direction with respect to a rotational output member 81 which will be described hereinafter.

Figure 4:
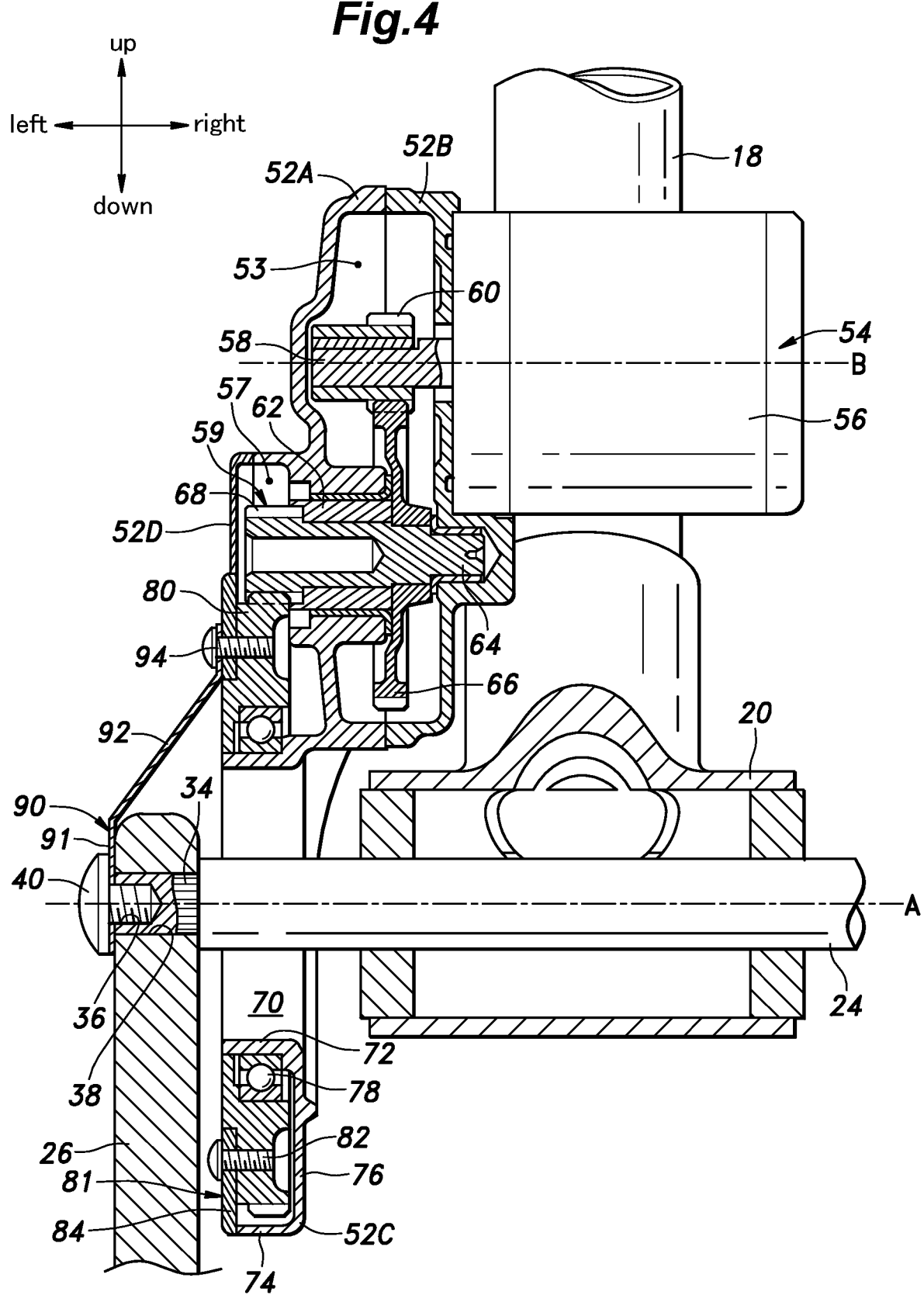
FIG. 4 is a vertical sectional view of the bicycle electric power assist device according to the embodiment of the present invention.

As shown in FIG. 4, the electric motor 54 extends in the lateral direction, and is provided with an output shaft 58 projecting leftward via the second half 52B into the hollow interior of the housing 52. A small drive spur gear 60 is fixed to the output shaft 58. The first half 52A and the second half 52B rotatably support an intermediate shaft 64 extending in the lateral direction via a bush 62 or the like. The intermediate shaft 64 fixedly supports a large-diameter intermediate spur gear 66 that meshes with the drive spur gear 60 on the right side of the bush 62. Thus, the drive spur gear 60 and the intermediate spur gear 66 are accommodated in a first gear chamber 53 defined by the first half 52A and the second half 52B and having a sealed structure. The intermediate shaft 64 is integrally formed with a small-diameter intermediate spur gear 68 formed on the left side of the bush 62.

The first half 52A is integrally formed with an annular part 52C extending downward from a part thereof where the intermediate shaft 64 and the intermediate spur gear 68 are located. The annular part 52C includes a cylindrical portion 72 that defines a central opening 70 opening on both sides in the lateral direction, a substantially cylindrical outer peripheral portion 74 formed radially outward of and concentrically with the cylindrical portion 72, and a right side portion 76 in the form of an annular plate extending between the cylindrical portion 72 and the outer peripheral portion 74. Thus, the annular part 52C has an open side facing leftward. The central opening 70 has an inner diameter sufficiently larger than the outer diameter of the crankshaft 24, and the crankshaft 24 is passed laterally through the central opening in a loose fit.

An annular large-diameter output spur gear 80 is fitted on the outer periphery of the cylindrical portion 72 via a ball bearing 78 so as to be rotatable around a central axis extending in the lateral direction. Thereby, the output spur gear 80 can be supported with a simple structure by making use of the cylindrical portion 72 defining the central opening 70.

The output spur gear 80 meshes with the intermediate spur gear 68 at the upper side of the output spur gear 80. As a result, a transmission gear train 59 is formed between the drive spur gear 60 and the output spur gear 80 by using mutually parallel shafts fitted with the intermediate spur gear 66 and the intermediate spur gear 68. The transmission gear train 59 transmits the rotation of the output spur gear 80 that forms a part of the rotational output member 81 which will be described later to the electric motor 54. The transmission gear train 59 using the parallel shafts means a gear mechanism using gears 60, 66, 68, 80 having central axes which are all parallel to one another.

The output spur gear 80 forms a rotational output member 81 jointly with an annular rotational output plate 84 fixed to the left side surface of the output spur gear 80 in a concentric relationship by using a plurality of threaded bolts 82. Thus, the rotational output member 81 includes the output spur gear 80 and the rotational output plate 84, and is driven by the electric motor 54 into a rotational motion via the transmission gear train 59.

The entire left side surface of the rotational output plate 84 is exposed to the left on the left side of the annular part 52C, and is rotatable, jointly with output spur gear 80, radially outward of the central opening 70 and around the central axis extending laterally with respect to the cylindrical portion 72.

The rotational output plate 84 has an outer diameter larger than the outer diameter of the output spur gear 80, and conceals the teeth of the output spur gear 80 and the meshing portion between the output spur gear 80 and the intermediate spur gear 68 from the left side (open side) of the annular part 52C. Thus, the rotational output plate 84 serves as a cover member for the output spur gear 80 to protect the teeth of the output spur gear 80.

The rotational output plate 84 defines a second gear chamber 57 having a sealed structure in cooperation with the annular part 52C and the cover member 52D, and the intermediate spur gear 68 and the output spur gear 80 are accommodated in the second gear chamber 57.

Since the output spur gear 80 and the rotational output plate 84 are both concentric with the central opening 70, and are located radially outward of the cylindrical portion 72, the central opening 70 is exposed to the both sides without being obstructed by the output spur gear 80 or the rotational output plate 84, and extends laterally with a constant inner diameter.

The electric power assist device 50 can be installed on a bicycle 10 by a worker in the following way.

First of all, the left pedal 30 remote from the drive sprocket 32 is removed by using a common tool such as a spanner. Then, with the electric power assist device 50 tilted sideways (so that the electric motor 54 faces upward), the free end of the crank arm 26 on the left side is passed into the central opening 70, and the crank arm 26 is placed in the central opening 70. In this state, the electric power assist device 50 is moved along the extending direction of the crank arm 26 toward the base end thereof (toward the rotation center side).

Thus, once the crank arm 26 is passed through the rotational output member 81 and the annular part 52C, the electric power assist device 50 reaches the vicinity of the base end of the crank arm 26. It should be noted that the inner diameter of the central opening 70 is selected in relation with the outer shape of the crank arm 26 so that this installation process can be executed.

If the central opening 70 has an inner diameter that allows the crank arm 26 with the pedal 30 attached thereto to be passed through the central opening 70, the pedal 30 is not required to be removed from the crank arm 26.

Next, the posture of the electric power assist device 50 is changed so that the electric motor 54 is directed in the horizontal direction (the posture shown in FIG. 1) or, in other words, the central axis B of the electric motor 54 is parallel to the crank axis A. As a result, the crankshaft 24 is passed through the central opening 70 in the axial direction in a loose fit. As a result, the rotational output plate 84 and the annular part 52C are positioned between the frame 18 and the crank arm 26 in a loose fit simply by removing the pedal 30 or even without removing the pedal 30.

In this state, the electric motor 54 is positioned between the auxiliary tube 15 and the down tube 14 which are located one above the other in front of a lower end part of the seat tube 12 as shown in FIG. 1.

Since the electric motor 54 is located radially outwardly with respect to the rotational output member 81 owing to the positioning of the transmission gear train 59 between the electric motor 54 and the rotational output member 81, the electric motor 54 does not interfere with the crankshaft 24, and does not hinder the installation of the rotational output member 81 onto the crankshaft 24.

Since the electric motor 54 is offset to the one side in the axial direction with respect to the rotational output member 81, the electric motor 54 includes a part that is located between the auxiliary tube 15 and the down tube 14 which are located one above the other in front of a lower end part of the seat tube 12 as shown in FIG. 1, and overlaps with the frame 18 in plan view and in front view. The electric motor 54 is prevented from rotating with respect to the frame 18 by the outer casing 56 coming into contact with the down tube 14 or the auxiliary tube 15. As a result, the rotation of the electric motor 54 with respect to the frame 18 is prevented in a both simple and reliable manner.

The electric power assist device 50 may be attached to the frame 18 by securing the outer casing 56 of the electric motor 54 to the down tube 14 by using a fastening band 49 made of rubber, resin, metal, or the like. Here, the housing 52 of the electric power assist device 50 includes the outer casing 56 of the electric motor 54. The mounting of the electric power assist device 50 to the frame 18 by using the fastening band 49 may not be highly secure as long as the electric power assist device 50 does not rattle against the frame 18 when the bicycle 10 is traveling. Thus, the securing of the electric power assist device 50 to the frame 18 is not essential for the present invention, and may even be omitted.

In this mounted state, the rotational output plate 84 is exposed to the left between the tubular bearing housing 20 and the crank arm 26, and is connected to the rotational center of the crank arm 26 or coaxially to the crankshaft 24 via a connecting member 90 attached to this exposed (left) surface so that the assist force provided by the electric power assist device 50 is transmitted to the crankshaft 24.

Since the electric motor 54 is located radially outward of the annular part 52C and the rotational output plate 84 owing to the presence of the above-mentioned transmission gear train 59, the electric motor 54 does not hinder the mounting of the annular part 52C and the input plate 84 to the crank arm 26.

Figure 3:
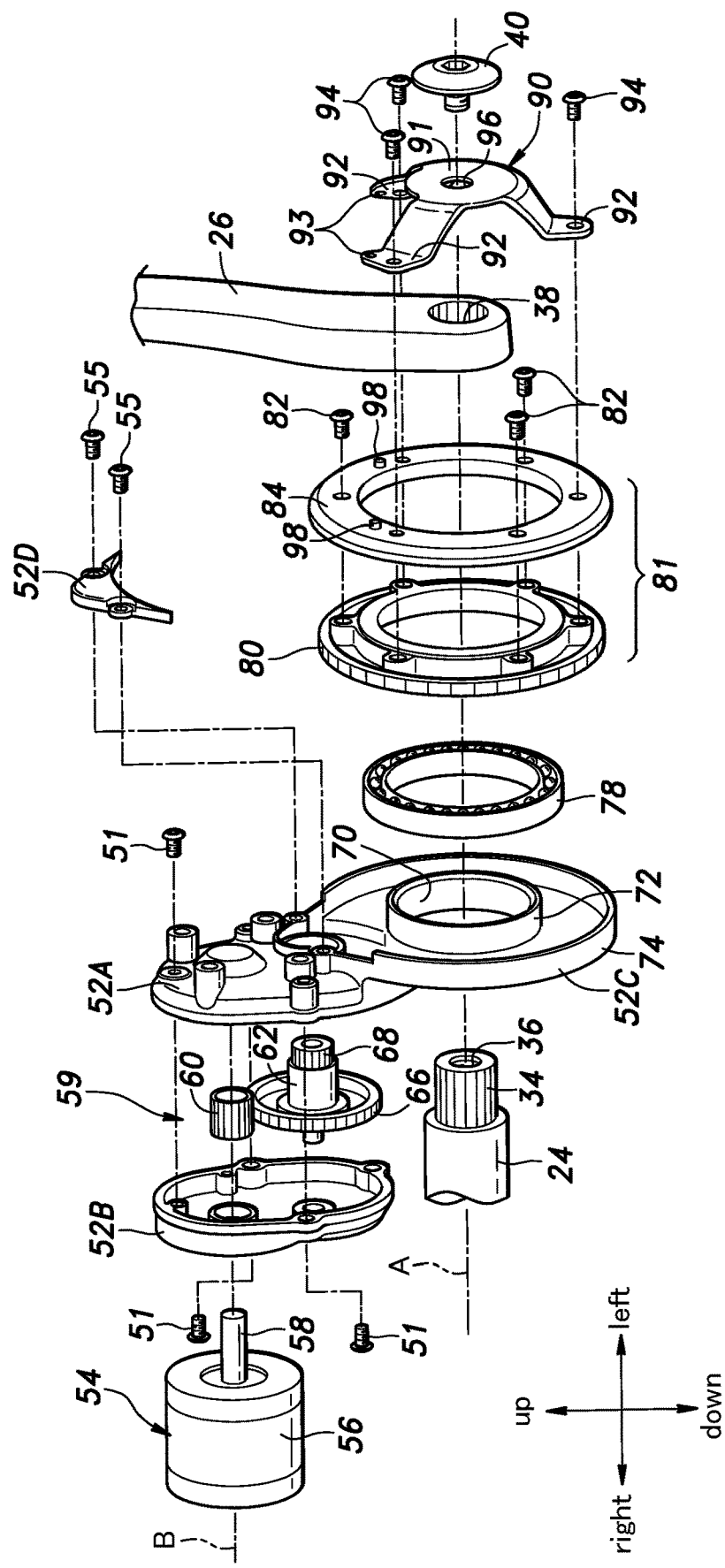
FIG. 3 is an exploded perspective view of the bicycle electric power assist device and a mounting structure for mounting an electric motor of the bicycle electric power assist device to the bicycle according to the embodiment of the present invention.

The connecting structure between the crankshaft 24 and the crank arm 26 in the ordinary bicycle 10 and the connection structure between the rotational output member 81 and the crankshaft 24 via the connecting member 90 are described in the following with reference to FIGS. 3 and 4.

The crankshaft 24 is provided with a splined part 34 having a smaller diameter than the remaining part thereof at an end part thereof. The axial end of the crank arm 26 is centrally provided with a threaded hole 36 for the convenience of removing the crankshaft 24. The base end of the crank arm 26 is provided with a splined hole 38 that is passed laterally through the base end. The splined part 34 is fitted into the splined hole 38 in a spline coupling, and a screw (crankshaft pulling screw) 40 is screwed into the threaded hole 36 from the outside of the crank arm 26, whereby the crankshaft 24 and the crank arm 26 are connected to each other so that a rotational force centered around the crank axis A can be transmitted between the crankshaft 24 and the crank arm 26.

The connecting member 90 is provided with a central portion 91 which is secured to the axial end of the crankshaft 24 by the screw 40 which is threaded into the threaded hole 36 of the crankshaft 24, and a plurality of legs 92 each extending radially from the central portion 91 and fixedly secured to the rotational output member 81 by a screw 94 at a free end thereof. Thereby, the rotational output member 81 is connected to the crankshaft 24 in a torque transmitting relationship around the crank axis A.

The rotational output plate 84 is provided with a plurality of knock pins 98 which are configured to fit into through holes 93 formed in the free ends of the respective legs 92 (at least two legs) of the connecting member 90 for positioning purpose. Thus, the connecting member 90 is positioned with respect to the rotational output plate 84 so that the connecting member 90 is coaxial with the rotational output plate 84 by fitting the knock pins 98 into the corresponding through holes 93. It should be noted that the inner diameter of the through hole 96 formed in the central portion 91 for the screw 40 may be larger than the outer diameter of the screw 40 so that the central portion 91 may be connected to the crankshaft 24 by the screw 40 after the connecting member 90 is fixedly secured to the rotational output member 81.

As a result, the crankshaft 24 and the rotational output member 81 are concentrically (coaxially) connected to each other with respect to the crank axis A by the connecting member 90 and the screw 40 of the existing bicycle 10 in such a manner that the rotation of the rotational output member 81 can be transmitted to the crankshaft 24 without the fear of creating any runout.

According to the electric power assist device 50 described above, an ordinary user can retrofit the electric power assist device 50 to any existing bicycle 10 without regard to the frame structure thereof, and convert the bicycle 10 into an electric power assisted bicycle with ease without modifying the bicycle and without requiring any special tool or simply by using an ordinary tool such as a spanner, and possibly without even the need to remove the pedal 30. The bicycles 10 that can be converted into electric power assisted bicycles by the present invention are not limited to those having prescribed structures, but may be any of the existing bicycles 10.

As shown in FIG. 1, a control unit 100 for electric power assist and a battery 102 for storing electric power for the electric motor 54 and the control unit 100 are secured to the seat tube 12 by using a fastening band (not shown in the drawings) or the like. The control unit 100 and the battery 102 may be provided separately from the housing 52 and the electric motor 54 of the electric power assist device 50, and in such a case, may be electrically connected to the electric motor 54 by an electric cable (not shown in the drawings).

Thus, a high level of freedom can be achieved in the mode of installing the control unit 100 and the battery 102 to the bicycle 10, and disassembly and reassembly of the bicycle 10 are not required when installing the control unit 100 and the battery 102 to the bicycle 10.

Figure 5:
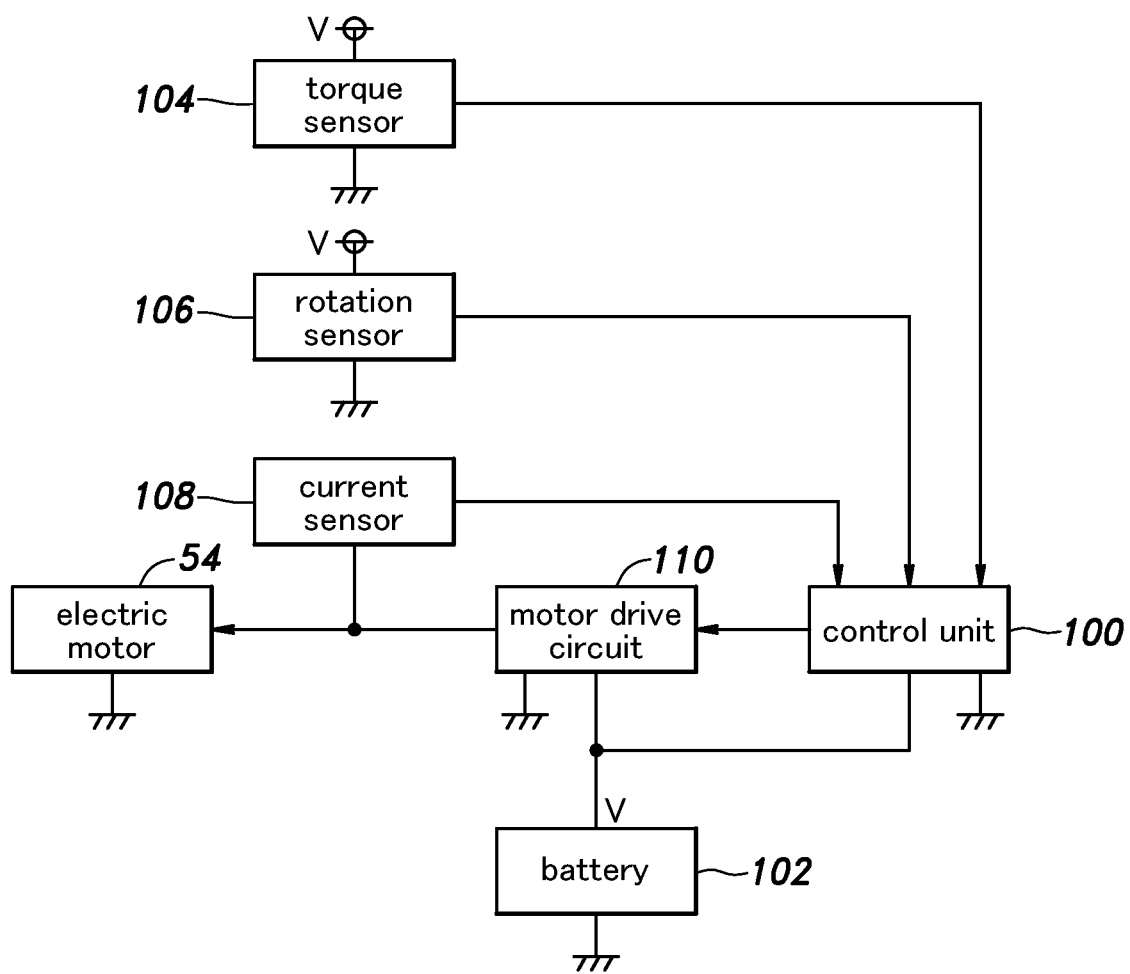
FIG. 5 is a block diagram of an electric system of the bicycle electric power assist device according to the embodiment of the present invention.

The electrical system of the electric power assist device 50 is described in the following with reference to FIG. 5.

The control unit 100 is of an electronic control type including a microcomputer or the like, and is configured to receive information on the pedaling force of the crank arm 26 obtained from a torque sensor 104, information on the rotational speed of the electric motor 54 or the crank arm 26 obtained from a rotation sensor 106, and information on the electric current of the electric motor 54 obtained from a current sensor 106, and based on this information, determines the assist force and forwards a corresponding command signal on the current to be supplied to the electric motor 54 to a motor drive circuit 110. The motor drive circuit 110 controls the electric current to be supplied to the electric motor 54 according to the command signal received from the control unit 100.

Thereby, the electric motor 54 is driven so as to provide the required assist force which is transmitted from the rotational output member 81 to the crankshaft 24 with the result that the pedaling force that is required to be exerted by the user to propel the bicycle 10 can be reduced.

Figure 6:
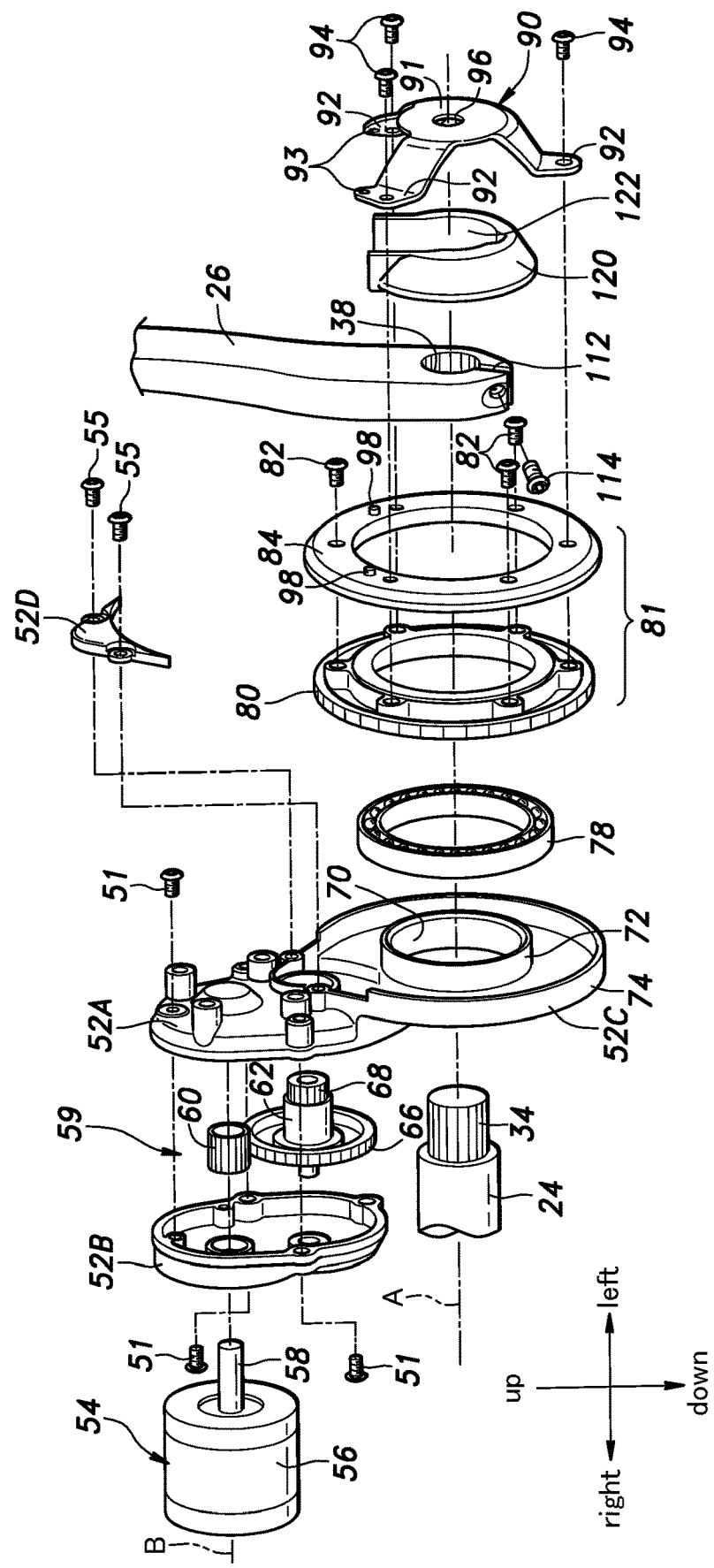
FIG. 6 is an exploded view of a bicycle electric power assist device and a mounting structure for mounting the bicycle electric power assist device to the bicycle according to another embodiment of the present invention.

An electric power assist device 50 according to another embodiment is described in the following with reference to FIG. 6. This embodiment is applied to a bicycle 10 in which a threaded hole 36 for removing the crankshaft is absent, and the crank arm 26 is connected to the crankshaft 24 by tightening a slit 132 formed in the crank arm 26 with a fastening bolt 134 instead of using a screw 40.

The electric power assist device 50 including the connecting member 90 used on this bicycle 10 is no different from the one used on the bicycle 10 having the threaded hole 36 for pulling out the crankshaft, and the connecting member 90 is connected to the rotational output member 81 in an identical fashion. In other words, the same connecting member 90 can be used as a common component part for both the bicycle 10 having a threaded hole 36 for pulling out the crankshaft and a bicycle 10 having no such threaded hole.

In the bicycle 10 of this type, a spacer member 120 is used instead of the screw 40. The spacer member 120 surrounds the base end of the crank arm 26 in a U shape (horseshoe shape), and includes a part located between the legs 92 of the connecting member 90 and the outer periphery of the base end of the crank arm 26 so as to surround the base end of the crank arm 26 and define an opening 122 conforming to the base end of the crank arm 26. The spacer member 120 thus connects the connecting member 90 to the crank arm 26 in a torque transmitting relationship.

As a result, the rotational force (assist force) can be transmitted from the rotational output member 81 to the crank arm 26 via the spacer member 120.

In the bicycle 10 of this type also, an ordinary user can easily retrofit the electric power assist device 50 to the bicycle 10 without modifying the bicycle 10 or requiring any special tool to convert the bicycle 10 into an electric power assisted bicycle in a simple manner.

As described above, the electric power assist device 50 according to the present embodiment can be mounted to a wide range of existing bicycles, possibly with the optional use of the spacer member 120.

Figure 7:
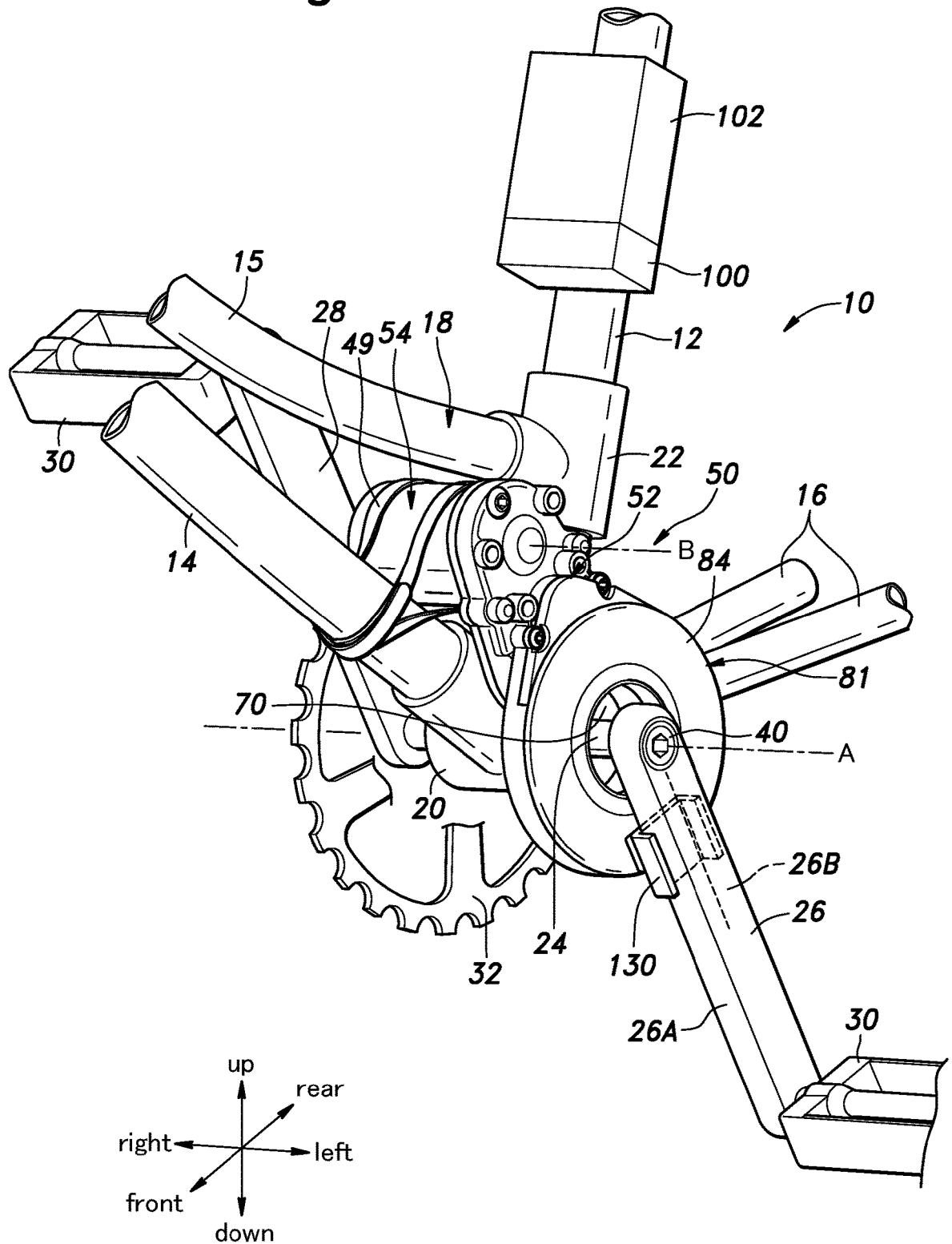
FIG. 7 is a perspective view of the bicycle electric power assist device according to yet another embodiment of the present invention.

A bicycle electric power assist device according to yet another embodiment of the present invention is described in the following with reference to FIG. 7. In FIG. 7, the parts corresponding to those in FIG. 1 are denoted with like reference numerals as those in FIG. 1, and description of such parts may be omitted.

In this embodiment, a staple-shaped connecting member 130 is fixed to the rotational output plate 84. The connecting member 130 projects laterally outward, and interposes a base end part of the crank arm 26 from the front and rear so as to be in contact with the front surface 26A and the rear surface 26B of the crank arm 26, and slidable (slidable) along the crank arm 26 in the longitudinal direction of the crank arm 26. In other words, the connecting member 130 is configured to grip the crank arm 26 from both sides with respect to the rotational direction.

According to this embodiment, the connecting member 130 transmits the rotational force (assist force) from the rotational output plate 84 to the crank arm 26 by sliding relative to the crank arm 26, and any center misalignment of the rotational output plate 84 relative to the rotation center (runout) of the crank arm 26 can be absorbed by the sliding movement of the crank arm 26 in the longitudinal direction.

In this embodiment also, an ordinary user can easily retrofit the electric power assist device 50 to a wide range of existing bicycles 10 without the need to modify the bicycle 10 and without requiring any special tool so that a wide range of existing bicycles 10 can be converted into electric power assisted bicycles without any difficulty.

The present invention has been described in terms of specific embodiments, but is not limited by such embodiments, and can be modified in various ways without departing from the scope of the present invention. For example, the electric motor 54 may be prevented from rotating by contacting the seat tube 12 or the chain stay 16, instead of the down tube 14 or the auxiliary tube 15. The electric power assist device 50 may be attached to any outer part of the bicycle such as the seat tube 12, the down tube 14, the auxiliary tube 15, the chain stay 16, and the pipe joint 22. The gears of the transmission gear train 59 may be helical gears instead of spur gears. In addition, all the components shown in the above embodiment are not necessarily essential to the present invention, and can be appropriately selected, substituted and omitted without departing from the gist of the present invention.

GLOSSARY OF TERMS

| | |
|---|---|
| 10: bicycle | 12: seat tube |
| 14: down tube | 15: auxiliary tube |
| 16: chain stay | 18: frame |
| 20: tubular bearing housing | 22: pipe joint |
| 24: crankshaft | 26: crank arm |
| 26A: front surface | 26B: rear surface |
| 28: crank arm | 30: pedal |
| 32: drive sprocket | 34: splined part |
| 36: screw hole | 38: splined hole |
| 40: screw | 49: fastening belt |
| 50: electric power assist device | 51: bolt |
| 52: housing | 52A: first half |
| 52B: second half | 52C: annular part |
| 52D: cover member | 53: first gear chamber |
| 54: electric motor | 55: bolt |
| 56: outer casing | 57: second gear chamber |
| 58: output shaft | 59: gear train |

| | |
|---|---|
| 60: drive spur gear | 62: bush |
| 64: intermediate shaft | 66: intermediate spur gear |
| 68: intermediate spur gear | 70: central opening |
| 72: cylindrical portion | 74: outer peripheral portion |
| 76: right side portion | 78: ball bearing |
| 80: output spur gear (output gear) | 81: rotational output member |
| 82: bolt | 84: rotational output plate |
| 90: connecting member | 91: central part |
| 92: leg | 93: through hole |
| 94: screw | 96: through hole |
| 98: knock pin | 100: control unit |
| 102: battery | 104: torque sensor |
| 106: rotation sensor | 108: current sensor |
| 110: motor drive circuit | 112: slit |
| 114: fastening bolt | 120: spacer member |
| 122: opening | 130: connecting member |

The invention claimed is:

1. A bicycle electric power assist device, comprising:
a housing configured to be supported by a frame of a bicycle;
an electric motor attached to the housing;
a battery serving as a power source for the electric motor;
an annular rotational output member rotationally driven by the electric motor, the rotational output member being rotatably mounted on the housing and positioned around a crank axis line which is a rotational center line of a crankshaft and a crank arm for a pedal of the bicycle; and
a connecting member connecting the rotational output member to the crankshaft or the crank arm in a torque transmitting relationship,
wherein the housing includes an annular part that concentrically supports the rotational output member, and the rotational output member and the annular part are positioned between the frame and the crank arm, and
wherein the annular part is provided with a tubular portion defining a central opening through which the crankshaft loosely passes, and the rotational output member is coaxially and rotatably mounted on an outer periphery of the tubular portion.

2. The bicycle electric power assist device according to claim 1, further comprising a transmission gear train received in the housing and configured to transmit a rotational motion of the electric motor to the rotational output member, the electric motor being displaced radially outward from the rotational output member via the transmission gear train which is positioned between the electric motor and the rotational output member.

3. The bicycle electric power assist device according to claim 2, wherein the rotational output member is provided with an output gear of the transmission gear train and a rotational output plate attached to a side of the output gear, the rotational output plate having a larger outer diameter than the output gear.

4. The bicycle electric power assist device according to claim 1, wherein the electric motor is offset in an axial direction relative to the rotational output member, and in contact with the frame so that the electric motor is held rotationally fast to the frame.

5. The bicycle electric power assist device according to claim 1, wherein the connecting member coaxially connects the rotational output member to an axial end of the crankshaft.

6. The bicycle electric power assist device according to claim 5, wherein the connecting member includes a central portion secured to a shaft end of the crankshaft by a screw threaded into a threaded hole formed centrally in the shaft end, and at least one leg extending radially outward from the central portion and secured to the rotational output member at a free end thereof.

7. The bicycle electric power assist device according to claim 5, wherein the connecting member includes a central portion opposing an outer surface of a shaft end of the crankshaft, and at least one leg extending radially outward from the central portion and secured to the rotational output member by a screw at a free end thereof, and the bicycle electric power assist device further comprises a spacer member including a part located between the leg and a base end of the crank arm and surrounding the base end of the crank arm in a shape of letter-U to connect the connecting member to the crank arm in a torque transmitting relationship.

8. The bicycle electric power assist device according to claim 5, wherein the connecting member projects from the rotational output member so as to interpose the crank arm from two sides with respect to a rotational direction thereof and to be slidable with respect to the crank arm in a lengthwise direction thereof.

9. A bicycle fitted with the bicycle electric power assist device according to claim 1.

* * * * *